US011360532B2

(12) United States Patent
Koga

(10) Patent No.: US 11,360,532 B2
(45) Date of Patent: Jun. 14, 2022

(54) POWER SUPPLY APPARATUS AND POWER RECEIVING APPARATUS

(71) Applicant: ROHM CO., LTD., Kyoto (JP)

(72) Inventor: Fuminori Koga, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 48 days.

(21) Appl. No.: 16/849,285

(22) Filed: Apr. 15, 2020

(65) Prior Publication Data

US 2020/0241619 A1 Jul. 30, 2020

Related U.S. Application Data

(60) Division of application No. 15/660,231, filed on Jul. 26, 2017, now Pat. No. 10,664,029, which is a
(Continued)

(30) Foreign Application Priority Data

Jan. 26, 2015 (JP) .................. 2015-012573
Jan. 26, 2015 (JP) .................. 2015-012574

(51) Int. Cl.
*G06F 1/26* (2006.01)
*G06F 1/20* (2006.01)
(Continued)

(52) U.S. Cl.
CPC ............... *G06F 1/266* (2013.01); *G06F 1/20* (2013.01); *G06F 1/26* (2013.01); *G06F 1/3287* (2013.01);
(Continued)

(58) Field of Classification Search
CPC .......... G06F 1/266; G06F 1/20; G06F 1/3287; G06F 1/3296
See application file for complete search history.

(56) References Cited

U.S. PATENT DOCUMENTS 6,774,604 B2 * 8/2004 Matsuda ............... G06F 1/263
320/110
6,996,636 B2 * 2/2006 Hung ................... G06F 13/385
710/110
(Continued)

FOREIGN PATENT DOCUMENTS

CN 1444150 A 9/2003
CN 102570538 A 7/2012
(Continued)

OTHER PUBLICATIONS

CNIPA First Office Action corresponding to Application No. 201680007095.7; dated Jul. 30, 2019.
(Continued)

*Primary Examiner* — Aurel Prifti
(74) *Attorney, Agent, or Firm* — Cantor Colburn LLP

(57) ABSTRACT

A power supply apparatus supports USB-PD (Universal Serial Bus-Power Delivery) specification. A bus voltage $V_{BUS}$ is transmitted via a bus line. A first power supply circuit generates a first bus voltage having a first voltage level. A second power supply circuit generates a second bus voltage having a second voltage level that is higher than the first voltage level. A first switch is arranged between the bus line and an output terminal of the first power supply circuit. A second switch is arranged between the bus line and an output terminal of the second power supply circuit. A control circuit receives a control signal S1 via the bus line from a power receiving apparatus, which is a power supply target. The control circuit is structured to control the first switch and the second switch based on the control signal S1.

16 Claims, 8 Drawing Sheets

Related U.S. Application Data continuation of application No. PCT/JP2016/050260, filed on Jan. 6, 2016.

(51) Int. Cl.
| | |
|---|---|
| *H02J 1/00* | (2006.01) |
| *H02J 7/00* | (2006.01) |
| *G06F 1/3287* | (2019.01) |
| *G06F 1/3296* | (2019.01) |
| *H02J 1/08* | (2006.01) |

(52) U.S. Cl.
CPC .............. *G06F 1/3296* (2013.01); *H02J 1/00* (2013.01); *H02J 7/00* (2013.01); *H02J 1/082* (2020.01); *H02J 7/00034* (2020.01)

(56) References Cited

U.S. PATENT DOCUMENTS

| | | | | |
|---|---|---|---|---|
| 7,159,132 | B2 | 1/2007 | Takahashi et al. | |
| 7,360,105 | B2* | 4/2008 | Kato | G06F 1/3221 713/323 |
| 7,519,840 | B2* | 4/2009 | Lim | G06F 1/3203 713/300 |
| 8,266,456 | B2* | 9/2012 | Chang | H02J 7/007 713/300 |
| 8,350,522 | B2* | 1/2013 | Johnson | G06F 1/305 320/107 |
| 8,627,122 | B2* | 1/2014 | Lu | H02J 7/00047 713/300 |
| 8,760,123 | B2* | 6/2014 | Hawawini | H02J 7/02 320/137 |
| 8,769,160 | B2* | 7/2014 | Park | G06F 13/387 710/11 |
| 2003/0172312 | A1 | 9/2003 | Takahashi et al. | |
| 2007/0070558 | A1* | 3/2007 | Liu | H02H 3/12 361/18 |
| 2008/0155143 | A1* | 6/2008 | Mochizuki | G06F 1/266 710/64 |
| 2008/0272741 | A1* | 11/2008 | Kanamori | H02J 7/00 320/137 |
| 2009/0100275 | A1* | 4/2009 | Chang | G06F 1/266 713/300 |
| 2009/0121686 | A1* | 5/2009 | Lo | G06F 1/325 327/544 |
| 2010/0064148 | A1* | 3/2010 | Ho | H02J 1/00 713/300 |
| 2010/0287399 | A1* | 11/2010 | Yasuda | G06F 1/28 713/340 |
| 2011/0169448 | A1* | 7/2011 | Ichikawa | B60L 58/12 320/109 |
| 2011/0221604 | A1* | 9/2011 | Johnson | G06F 1/305 340/664 |
| 2011/0276819 | A1* | 11/2011 | Dong | H04W 52/0261 713/340 |
| 2011/0316472 | A1* | 12/2011 | Han | G06F 13/4068 320/103 |
| 2012/0098517 | A1* | 4/2012 | Esumi | H02H 3/08 323/311 |
| 2012/0151231 | A1* | 6/2012 | Hatta | G06F 1/266 713/320 |
| 2013/0088196 | A1* | 4/2013 | Chen | H02M 1/4225 320/109 |
| 2013/0232348 | A1* | 9/2013 | Oler | G06F 1/26 713/300 |
| 2013/0313904 | A1* | 11/2013 | Kayama | G06F 1/26 307/26 |
| 2013/0339757 | A1* | 12/2013 | Reddy | G06F 1/3212 713/300 |
| 2014/0059361 | A1* | 2/2014 | Tajima | G06F 1/266 713/300 |
| 2014/0111139 | A1* | 4/2014 | Chen | H02J 7/04 336/170 |
| 2014/0122909 | A1* | 5/2014 | Hawawini | H02J 7/00036 713/310 |
| 2014/0285147 | A1* | 9/2014 | Sawada | H02J 7/007 320/109 |
| 2015/0069958 | A1* | 3/2015 | Yang | H02J 7/007 320/107 |
| 2015/0123597 | A1* | 5/2015 | Son | H02J 7/0068 320/107 |
| 2015/0180244 | A1* | 6/2015 | Jung | H02J 7/00036 320/107 |
| 2015/0362944 | A1* | 12/2015 | Sporck | G05F 5/00 323/303 |
| 2016/0028254 | A1* | 1/2016 | Honoki | H02J 7/007 320/162 |
| 2016/0334857 | A1* | 11/2016 | Hobson | G06F 9/4418 |
| 2017/0126041 | A1* | 5/2017 | Sato | H02M 3/04 |
| 2018/0019585 | A1 | 1/2018 | Koga et al. | |
| 2019/0115829 | A1 | 4/2019 | Oporta et al. | |

FOREIGN PATENT DOCUMENTS

| | | |
|---|---|---|
| CN | 202421926 U | 9/2012 |
| JP | 2003263245 A | 9/2003 |
| JP | 2006060977 A | 3/2006 |
| JP | 2006304500 A | 11/2006 |
| JP | 2012190216 A | 10/2012 |
| JP | 2013198262 A | 9/2013 |
| JP | 2015002399 A | 1/2015 |
| WO | 2014070612 A2 | 5/2014 |

OTHER PUBLICATIONS

International Preliminary Report on Patentability corresponding to Application No. PCT/JP2016/050260; dated Aug. 1, 2017.

International Search Report corresponding to Application No. PCT/JP2016/050260; dated Mar. 22, 2016.

JPO Notification of Reasons for Refusal corresponding to Application No. 2016-571889; dated Jul. 2, 2019.

KIPO Notification of Reason for Refusal corresponding to KR10-2017-7023503 dated Jan. 30, 2020.

U.S. Non-Final Office Action for U.S. Appl. No. 16/660,231, dated Sep. 19, 2019.

U.S. Notice of Allowance for U.S. Appl. No. 16/660,231 dated Jan. 17, 2020.

T. Shimotoyodome, "The expansion of DC power supply using USB Power Delivery," Proceedings of the 2014 Society Conference of IEICE 2, Sep. 9, 2014, pp. S-28-S-29.

\* cited by examiner

<Prior Art>

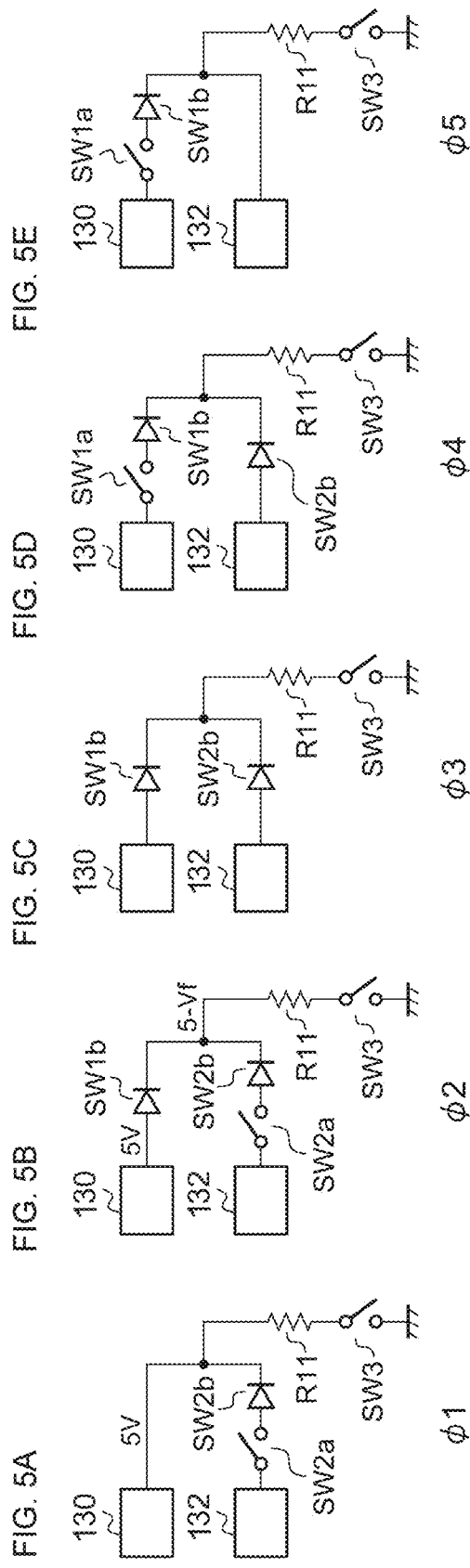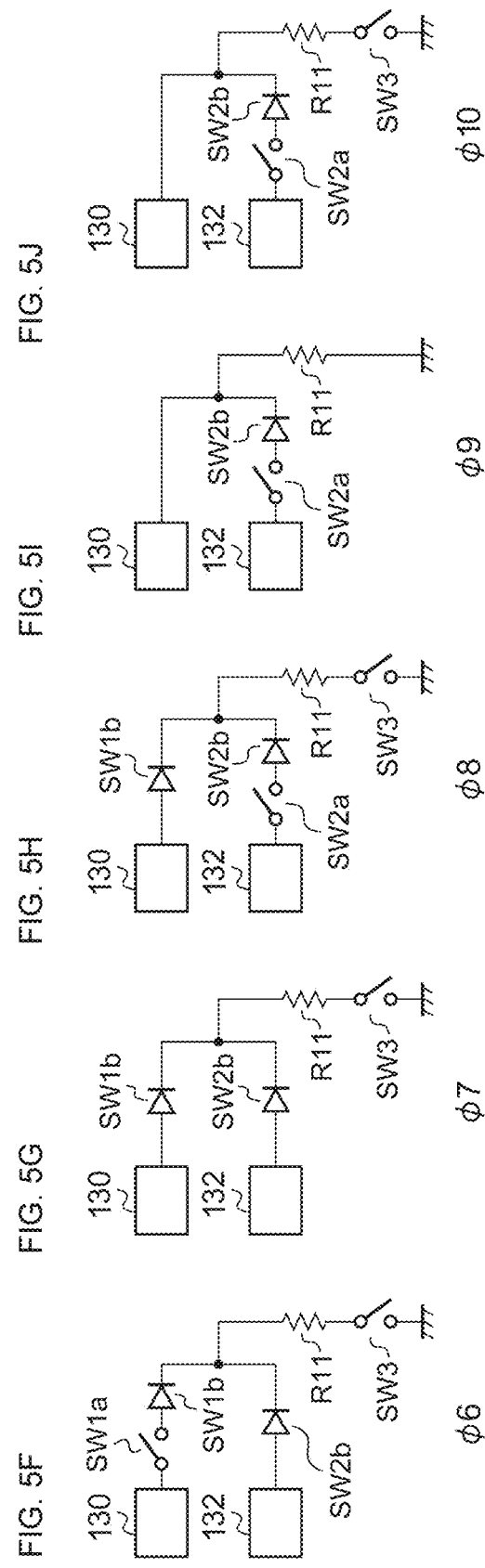

POWER SUPPLY APPARATUS AND POWER RECEIVING APPARATUS

CROSS REFERENCE TO RELATED APPLICATIONS

The present application is a divisional application of U.S. patent application Ser. No. 15/660,231, filed Jul. 26, 2017, the entire contents of which are incorporated herein by reference. The application Ser. No. 15/660,231 is a continuation of PCT/JP2016/050260, filed on Jan. 6, 2016 and claims priority under 35 U.S.C. § 119 to Japanese Patent Applications No. 2015-012573, filed on Jan. 26, 2015 and No. 2015-012574, filed on Jan. 26, 2015, the entire contents of which are both incorporated herein by reference.

BACKGROUND OF THE INVENTION

1. Field of the Invention

The present invention relates to a USB power supply.

2. Description of the Related Art

Battery-driven devices such as cellular phone terminals, tablet terminals, laptop personal computers, and portable audio players each include a rechargeable secondary battery and a charger circuit that charges the secondary battery as built-in components. A charger circuit is known, which charges a secondary battery using a DC voltage supplied from a USB (Universal Serial Bus) host adapter via a USB cable.

At present, charger circuits mounted on mobile devices conform to a specification which is referred to as the "USB Battery Charging Specification" (which will be referred to as the "BC specification" hereafter). There are several kinds of host adapters. As the kinds of chargers that conform to revision 1.2 of the BC specification, SDP (Standard Downstream Port), DCP (Dedicated Charging Port), and CDP (Charging Downstream Port) have been defined. The current (current capacity) that can be provided by a host adapter is defined according to the kind of charger. Specifically, DCP and CDP are defined to provide a current capacity of 1500 mA. Also, SDP is defined to provide a current capacity of 100 mA, 500 mA, or 900 mA, according to the USB version.

As a next-generation secondary battery charging method or system using USB, a specification which is referred to as the "USB Power Delivery Specification" (which will be referred to as the "PD specification" hereafter) has been developed. The PD specification allows the available power to be dramatically increased up to a maximum of 100 W, as compared with the BC specification, which provides a power capacity of 7.5 W. Specifically, the PD specification allows a USB bus voltage that is higher than 5 V (specifically, 12 V, 20 V). Furthermore, the PD specification allows a charging current that is greater than that defined by the BC specification (specifically, the PD specification allows a charging current of 2 A, 3 A, 5 A).

1. With the PD specification, a power supply apparatus, which functions as a power supply source, generates a bus voltage $V_{BUS}$ that is switchable between multiple voltages. Description will be made below regarding an example in which the power supply apparatus is capable of switching the bus voltage $V_{BUS}$ between 5 V and 20 V. FIG. 1 is a circuit diagram showing a power supply apparatus 300 investigated by the present inventor.

The power supply apparatus 300 includes a DC/DC converter 302, resistors R1 and R2, a control IC (Integrated Circuit) 304, a bus line 306, and a connector 308. The connector 308 is coupled to an unshown power receiving apparatus via a USB cable 310.

The DC/DC converter 302 includes an OUT (output) terminal and an FB (feedback) terminal. The OUT terminal is coupled to the bus line 306. The DC/DC converter 302 stabilizes the output voltage $V_{BUS}$ such that a feedback voltage $V_{FB}$ fed back to the FB terminal matches a predetermined reference voltage $V_{REF}$.

The resistors R1 and R2 are arranged in series between the bus line 306 and the ground, so as to divide the bus voltage $V_{BUS}$, thereby generating the feedback voltage $V_{FB}$ that is proportional to the bus voltage $V_{BUS}$. With the voltage dividing ratio as K, the following Expression (1) holds true. The resistor R2 is configured as a variable resistor, thereby allowing the voltage dividing ratio K to be adjusted.

$$V_{FB} = V_{BUS} \times K \quad (1)$$

As described above, as a result of the feedback operation, the relation $V_{FB} = V_{REF}$ holds true. Accordingly, the bus voltage $V_{BUS}$ is stabilized to the voltage level represented by the following Expression (2).

$$V_{BUS} = V_{REF}/K \quad (2)$$

The control IC 304 transmits/receives a signal to/from an unshown power receiving apparatus via the bus line 306. The control IC 304 determines the voltage level of the bus voltage $V_{BUS}$ based on negotiation. Subsequently, the voltage dividing ratio K is switched according to the voltage level thus determined, thereby allowing the bus voltage $V_{BUS}$ to be generated according to a request from the power receiving apparatus.

With the power supply apparatus 300 shown in FIG. 1, the single DC/DC converter 302 supports the generation of a bus voltage $V_{BUS}$ that is switchable between multiple different voltage levels. This leads to a problem of increased costs required for the DC/DC converter 302.

2. It is conceivable that, in some cases, the impedance of the charging path rises due to partial disconnection of a charging cable, loose connection of a connector, or the like. The PD specification supports the flow of a large amount of current on the order of several A, which provides a rapid charging operation. However, in a case in which such a large amount of current flows through a charging path having high impedance, this leads to a problem of heat generation or the like.

The conventional BC specification supports a constant bus voltage $V_{BUS}$ of 5 V. Accordingly, by setting a threshold voltage $V_{TH}$ that is lower than the constant bus voltage, such an arrangement is capable of detecting an abnormal state of the system. This function is also referred to as "UVLO (Under Voltage Lock Out)", and is widely employed in various kinds of devices. However, with the PD specification, the bus voltage $V_{BUS}$ is switchable between various voltage levels according to the kind of device. Accordingly, such a threshold voltage $V_{TH}$ cannot be determined. Thus, it is difficult for such a conventional technique to detect an abnormal state.

SUMMARY OF THE INVENTION

The present invention has been made in view of such a situation. Accordingly, it is an exemplary purpose of an embodiment of the present invention to provide a power supply apparatus having a low-cost configuration that is capable of generating multiple bus voltages $V_{BUS}$.

Also, it is an exemplary purpose of another embodiment of the present invention relates to a power receiving apparatus that supports PD specification, configured to be capable of detecting an abnormal state.

1. An embodiment of the present invention relates to a power supply apparatus that supports USB-PD (Universal Serial Bus-Power Delivery) specification. The power supply apparatus comprises: a bus line structured to transmit a bus voltage to be supplied; a first power supply circuit structured to generate a first bus voltage having a first voltage level; a second power supply circuit structured to generate a second bus voltage having a second voltage level that is higher than the first voltage level; a first switch arranged between the bus line and an output terminal of the first power supply circuit; a second switch arranged between the bus line and an output terminal of the second power supply circuit; and a control circuit structured to receive a control signal via the bus line from a power receiving apparatus, which is a power supply target, and to control the first switch and the second switch based on the control signal.

With such an embodiment, for each of the first power supply circuit and the second power supply circuit, switching of the output voltage is not required. This allows the first power supply circuit and the second power supply circuit to have a low-cost configuration. In this specification, "support a specification" is used not only in a case where a circuit or a device "conforms the specification", but also in a case where a circuit or a device "is compatible with the specification".

Also, the first switch may comprise a first transistor and a second transistor coupled in series. Also, the second switch may comprise a third transistor and a fourth transistor coupled in series. Also, a back gate of the first transistor may be coupled such that a cathode of a body diode thereof is coupled to an output terminal side of the first power supply circuit. Also, a back gate of the second transistor may be coupled such that a cathode of a body diode thereof is coupled to the bus line side. Also, a back gate of the third transistor may be coupled such that a cathode of a body diode thereof is coupled to an output terminal side of the second power supply circuit. Also, a back gate of the fourth transistor may be coupled such that a cathode of a body diode thereof is coupled to the bus line side.

Such an arrangement allows the output voltage from among those of multiple power supply circuits to be selectively employed while preventing the current from flowing in the reverse direction. Furthermore, this provides a diode OR circuit using the body diodes.

Also, the control circuit may be structured to switch a voltage level of the bus voltage via a state in which the first transistor and the third transistor are each turned on, the second transistor and the fourth transistor are each turned off.

In this state, the body diodes of the second transistor and the fourth transistor form an OR circuit, which selects a higher voltage from among the output voltages of the multiple power supply circuits. Accordingly, this prevents the bus voltage from becoming unstable when the voltage to be used is switched between the output voltages of the power supply circuits.

Also, the power supply apparatus according to an embodiment may further comprise: a capacitor arranged between the bus line and a ground; and a discharge switch arranged between the bus line and the ground. Also, the control circuit may be structured to control the discharge switch.

With such an embodiment, the charge stored in the capacitor can be drawn by means of the discharge switch, thereby allowing the bus voltage to be lowered with a high rate.

Also, the control circuit may be structured to turn on the discharge switch when the bus voltage is lowered from the second voltage level to the first voltage level.

Also, the control circuit may be structured to turn off the discharge switch when the voltage on the bus line drops to a threshold voltage that corresponds to the first voltage level after the discharge switch is turned on.

Also, the capacitor may form an LC filter together with an inductor arranged in series with the bus line.

Also, the control circuit may be structured such that, when the bus voltage is switched from the first voltage level to the second voltage level, the control circuit transits through states in order of: a first state in which the first transistor and the second transistor are each turned on, and the third transistor and the fourth transistor are each turned off; a second state in which the first transistor is turned on, and the second transistor, the third transistor, and the fourth transistor are each turned off; a third state in which the first transistor and the third transistor are each turned on, and the second transistor and the fourth transistor are each turned off; a fourth state in which the third transistor is turned on, and the first transistor, the second transistor, and the fourth transistor are each turned off; and a fifth state in which the third transistor and the fourth transistor are each turned on, and the first transistor and the second transistor are each turned off.

Also, the power supply apparatus may further comprise a discharge switch arranged between the bus line and a ground. Also, the control circuit may be structured to control the discharge switch. Also, the control circuit may be structured such that, when the bus voltage is switched from the first voltage level to the second voltage level, the control circuit transits through states in order of: a fifth state in which the third transistor and the fourth transistor are each turned on, and the first transistor, the second transistor, and the discharge switch are each turned off; a sixth state in which the third transistor is turned on, and the first transistor, the second transistor, the fourth transistor, and the discharge switch are each turned off; a seventh state in which the first transistor and the third transistor are each turned on, and the second transistor, the fourth transistor, and the discharge switch are each turned off; an eighth state in which the first transistor is turned on, and the second transistor, the third transistor, the fourth transistor, and the discharge switch are each turned off; a ninth state in which the first transistor, the second transistor, and the discharge switch are each turned on, and the third transistor and the fourth transistor are each turned off; and a tenth state in which the first transistor and the second transistor are each turned on, and the third transistor, the fourth transistor, and the discharge switch are each turned off.

Also, the first voltage level may be 5 V, and the second voltage level may be 12 V or otherwise 20 V.

Another embodiment of the present invention relates to a control circuit employed for a power supply apparatus that supports the USB-PD (Universal Serial Bus-Power Delivery) specification. The power supply apparatus comprises: a bus line structured to transmit a bus voltage to be supplied; a first power supply circuit structured to generate a first bus voltage having a first voltage level; a second power supply circuit structured to generate a second bus voltage having a second voltage level that is higher than the first voltage level; a first switch arranged between the bus line and an output terminal of the first power supply circuit; and a second switch arranged between the bus line and an output terminal of the second power supply circuit. The control circuit is structured to receive a control signal via the bus line from a power receiving apparatus, which is a power supply target, and to control the first switch and the second switch based on the control signal.

With such an embodiment, for each of the first power supply circuit and the second power supply circuit, switching of the output voltage is not required. This allows the first power supply circuit and the second power supply circuit to have a low-cost configuration.

Also, the control circuit may comprise: a communication terminal coupled to the bus line via a DC block capacitor; a discharge terminal coupled to the bus line; a discharge switch arranged between the discharge terminal and a ground; a communication unit coupled to the communication terminal; a logic circuit structured to generate an instruction signal which indicates states of the first switch, the second switch, and the discharge switch, based on a signal received by the communication unit; and a driver structured to switch on/off states of the first switch and the second switch based on a control signal which indicates the states of the first switch and the second switch.

Also, the first switch and the second switch may each comprise an N-channel MOSFET (Metal Oxide Semiconductor Field Effect Transistor). Also, the driver may comprise a booster circuit structured to generate a gate voltage for the N-channel MOSFETs.

Also, the first switch may comprise a first transistor and a second transistor coupled in series. Also, the second switch may comprise a third transistor and a fourth transistor coupled in series. Also, a back gate of the first transistor may be coupled such that a cathode of a body diode thereof is coupled to an output terminal side of the first power supply circuit. Also, a back gate of the second transistor may be coupled such that a cathode of a body diode thereof is coupled to the bus line side. Also, a back gate of the third transistor may be coupled such that a cathode of a body diode thereof is coupled to an output terminal side of the second power supply circuit. Also, a back gate of the fourth transistor may be coupled such that a cathode of a body diode thereof is coupled to the bus line side.

Also, the logic circuit may be structured to generate to an instruction signal for each of the first transistor, the second transistor, the third transistor, the fourth transistor, and the discharge switch.

Also, the control circuit may further comprise a comparator structured to compare the bus voltage with a threshold voltage that corresponds to the first voltage level. Also, the logic circuit may be structured to control the discharge switch based on an output of the comparator.

Also, the first voltage level may be 5 V, and the second voltage level may be 12 V or otherwise 20 V.

2. Yet another embodiment of the present invention relates to a power receiving apparatus that supports USB-PD (Universal Serial Bus-Power Delivery) specification. The power receiving apparatus comprises: a connector to which a USB cable is to be coupled; a bus line coupled to the connector, and structured to transmit a bus voltage; a switch arranged on the bus line; a charger circuit structured to receive the bus voltage, and to charge a secondary battery; and a control circuit structured to communicate with a power supply apparatus via the bus line, to control the switch, and to be capable of detecting an abnormal state of the USB cable. The control circuit determines a voltage level of the bus voltage based on communication with the power supply apparatus.

After the power supply apparatus starts to supply the bus voltage of the determined voltage level, the control circuit stores the voltage level of the bus voltage supplied to the bus line in a state in which the switch is turned off. Subsequently, in a state in which the switch is turned on, when the voltage level of the bus voltage becomes lower than a threshold value that corresponds to the voltage level of the bus voltage thus stored, the control circuit asserts an abnormal state detection signal.

With such an embodiment, in a state in which the switch is turned off, the current that flows through the cable or connector becomes substantially zero, which causes the voltage drop to become zero. By setting the threshold voltage based on the bus voltage actually supplied in this state, such an arrangement is capable of detecting an abnormal state due to the cable, connector, or the like, even in a case of employing the PD specification that supports a variable bus voltage.

Also, the control circuit may comprise: a communication unit structured to communicate with the power supply apparatus via the bus line; an A/D converter coupled to the bus line, and structured to convert the bus voltage supplied to the bus line into a digital value; a driver structured to control on/off switching of the switch; and a logic circuit structured: (1) to determine a voltage level of the bus voltage; (2) to hold the digital value acquired in a state in which the switch is turned off; (3) to turn on the switch; and (4) to compare the digital value thus held with a digital value acquired after the switch is turned on.

Also, the power receiving apparatus according to an embodiment may comprise: an inductor coupled in series with the bus line; and a DC block capacitor arranged such that one end thereof is coupled to the bus line, and the other end thereof is coupled to the communication unit of the control circuit.

In this case, by monitoring, by means of the control circuit, the bus voltage on the bus line that is closer to the charger circuit side than the inductor, this allows the threshold voltage to be set without being affected by voltage fluctuation on the bus line due to the communication by the communication unit.

Also, the switch may comprise a first transistor and a second transistor coupled in series. Also, the back gates of the first transistor and the second transistor may be coupled such that the directions of respective body diodes thereof are the reverse of each other. This prevents the current from flowing in the reverse direction.

Also, the driver may comprise a booster circuit.

Also, the secondary battery may be configured as a multi-cell battery.

Yet another embodiment of the present invention relates to an electronic device. The electronic device may comprise any one of the aforementioned power receiving apparatuses.

Yet another embodiment of the present invention relates to a USB charger. The USB charger may comprise the power receiving apparatus.

Yet another embodiment of the present invention relates to a control circuit employed for a power receiving apparatus that supports USB-PD (Universal Serial Bus-Power Delivery) specification. The power receiving apparatus comprises: a connector to which a USB cable is to be coupled; a bus line coupled to the connector, and structured to transmit a bus voltage; a switch arranged on the bus line; and a charger circuit structured to receive the bus voltage, and to charge a secondary battery. The control circuit determines a voltage level of the bus voltage based on communication with the power supply apparatus via the bus line. After the power supply apparatus starts to supply the bus voltage of the determined voltage level, the control circuit stores the voltage level of the bus voltage supplied to the bus line in a state in which the switch is turned off. Subsequently, in a state in which the switch is turned on, when the voltage level of the bus voltage becomes lower than a threshold value that corresponds to the voltage level of the bus voltage thus stored, the control circuit asserts an abnormal state detection signal.

Also, the control circuit may comprise: a communication unit structured to communicate with the power supply apparatus via the bus line; an A/D converter coupled to the bus line, and structured to convert the bus voltage supplied to the bus line into a digital value; a driver structured to control on/off switching of the switch; and a logic circuit structured: (1) to determine a voltage level of the bus voltage; (2) to hold the digital value acquired in a state in which the switch is turned off; (3) to turn on the switch; and (4) to compare the digital value thus held with a digital value acquired after the switch is turned on. Also, the control circuit may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit as a single IC, such an arrangement allows the circuit area to be reduced, and allows the circuit elements to have uniform characteristics.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A through 5J are equivalent circuit diagrams showing a power supply apparatus that corresponds to each state shown in FIG. 4;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

First Embodiment

Figure 1:
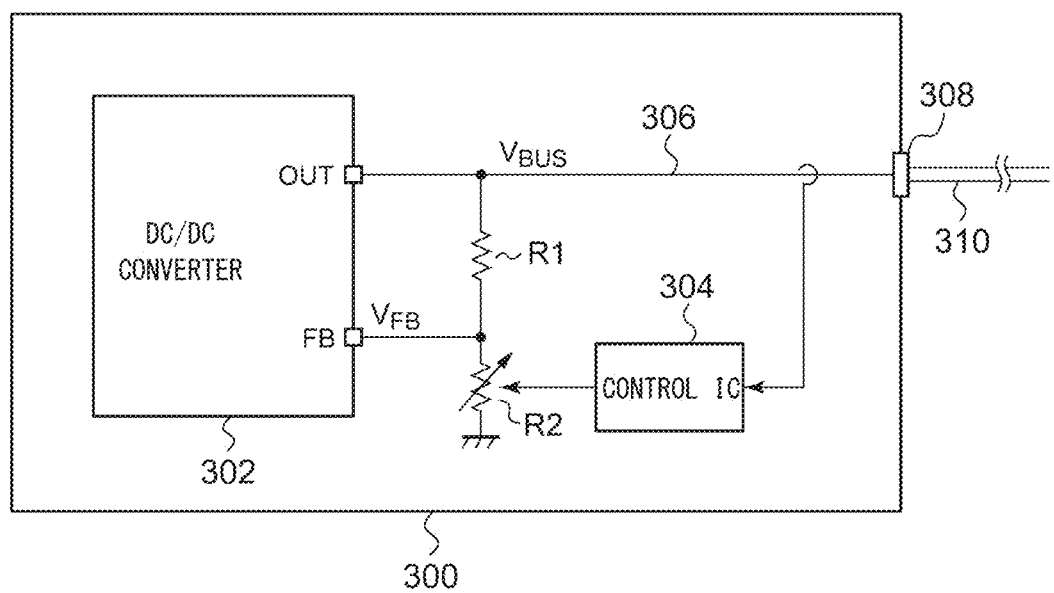
FIG. 1 is a circuit diagram showing a power supply apparatus investigated by the present inventor.
Figure 2:
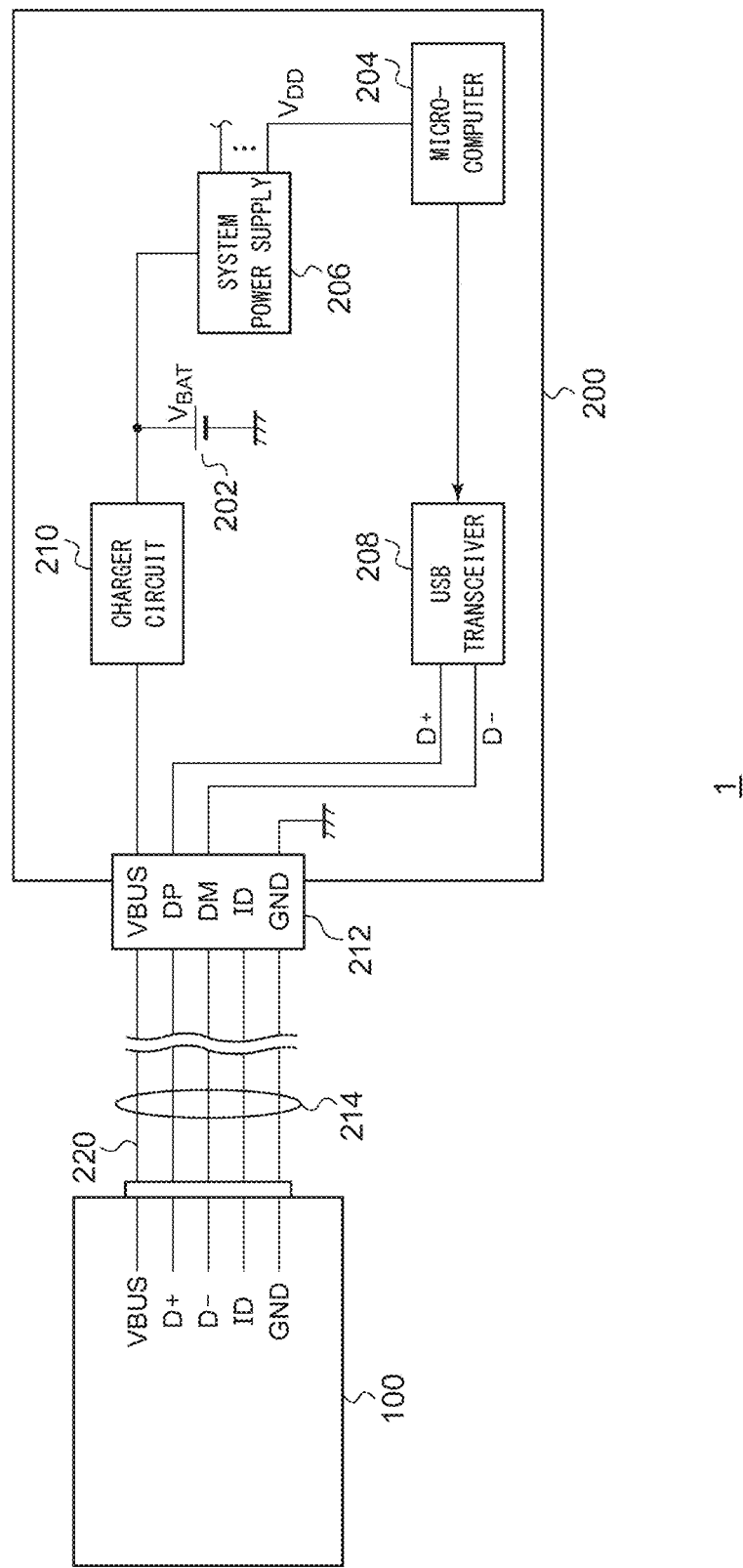
FIG. 2 is a block diagram showing a power supply system including a power supply apparatus according to a first embodiment.

FIG. 2 is a block diagram showing a power supply system 1 including a power supply apparatus 100 according to a first embodiment. The power supply system 1 includes the power supply apparatus 100 and a power receiving apparatus 200. The power supply apparatus 100 and the power receiving apparatus 200 each supports USB-PD specification. The power receiving apparatus 200 is configured as a battery-driven information terminal device such as a cellular phone terminal, tablet terminal, laptop PC (Personal Computer), digital still camera, digital video camera, or the like.

The power receiving apparatus 200 includes a secondary battery 202, a microcomputer 204, a system power supply 206, a USB transceiver 208, and a charger circuit 210.

The secondary battery 202 is configured as a secondary battery such as a lithium-ion battery, a nickel hydride battery, or the like. The secondary battery 202 outputs the battery voltage $V_{BAT}$. The number of cells employed in the secondary battery 200 is designed according to various kinds of power receiving apparatuses 200. In the case of employing a single cell, the battery voltage $V_{BAT}$ is on the order of appropriately 4.5 V. In the case of employing two cells, the battery voltage $V_{BAT}$ is approximately 9 V. Accordingly, in a case in which the power supply apparatus 100 is coupled to the power receiving apparatus 200 including the secondary battery 202 comprising a single cell, a bus voltage $V_{BUS}$ of 5 V may preferably be supplied, which is sufficient. However, for the power receiving apparatus 200 including the built-in secondary battery 202 comprising two or more cells, the power supply apparatus 100 is required to supply a bus voltage $V_{BUS}$ of 12 V or otherwise 20 V.

A USB port 212 of the power receiving apparatus 200 can be detachably coupled via a USB cable 214 to the power supply apparatus 100 that functions as a USB (Universal Serial Bus) host adapter.

More specifically, a DC voltage (which will be referred to as the "bus voltage" or "bus power") $V_{BUS}$ is supplied to a $V_{BUS}$ terminal of the USB port 212 from the power supply apparatus 100 via a bus line 220. ADP terminal and a DM terminal are coupled to data lines D+ and D− of the USB cable, respectively. An ID terminal is not used in the present embodiment. A GND terminal is coupled to the GND line.

The charger circuit 210 receives the bus voltage $V_{BUS}$, and charges the secondary battery 202. In the PD specification, a communication protocol is defined between the power supply apparatus 100 and the power receiving apparatus 200, which allows information to be transmitted between them via the bus line 220. This communication is performed in a manner in which a modulated signal is superimposed on the bus voltage $V_{BUS}$ at the bus line 220. The charger circuit 210 includes a communication unit (not shown) configured to communicate with the power supply apparatus 100 via the bus line 220.

The microcomputer 204 is a host processor that controls the overall operation of the power receiving apparatus 200. In a case in which the power receiving apparatus 200 is a wireless communication terminal, the microcomputer 204 corresponds to a baseband processor or an application processor.

The system power supply 206 steps up or otherwise steps down the battery voltage $V_{BAT}$, so as to generate multiple power supply voltages for respective blocks of the power receiving apparatus 200. The power supply voltage $V_{DD}$ generated by the system power supply 206 is supplied to the microcomputer 204.

The USB transceiver 208 performs data transmission/reception between itself and the power supply apparatus 100 via the signal lines D+ and D−.

The above is the schematic configuration of the power receiving apparatus 200. Next, description will be made regarding the power supply apparatus 100 that supplies the bus voltage $V_{BUS}$ to the power receiving apparatus 200.

Figure 3:
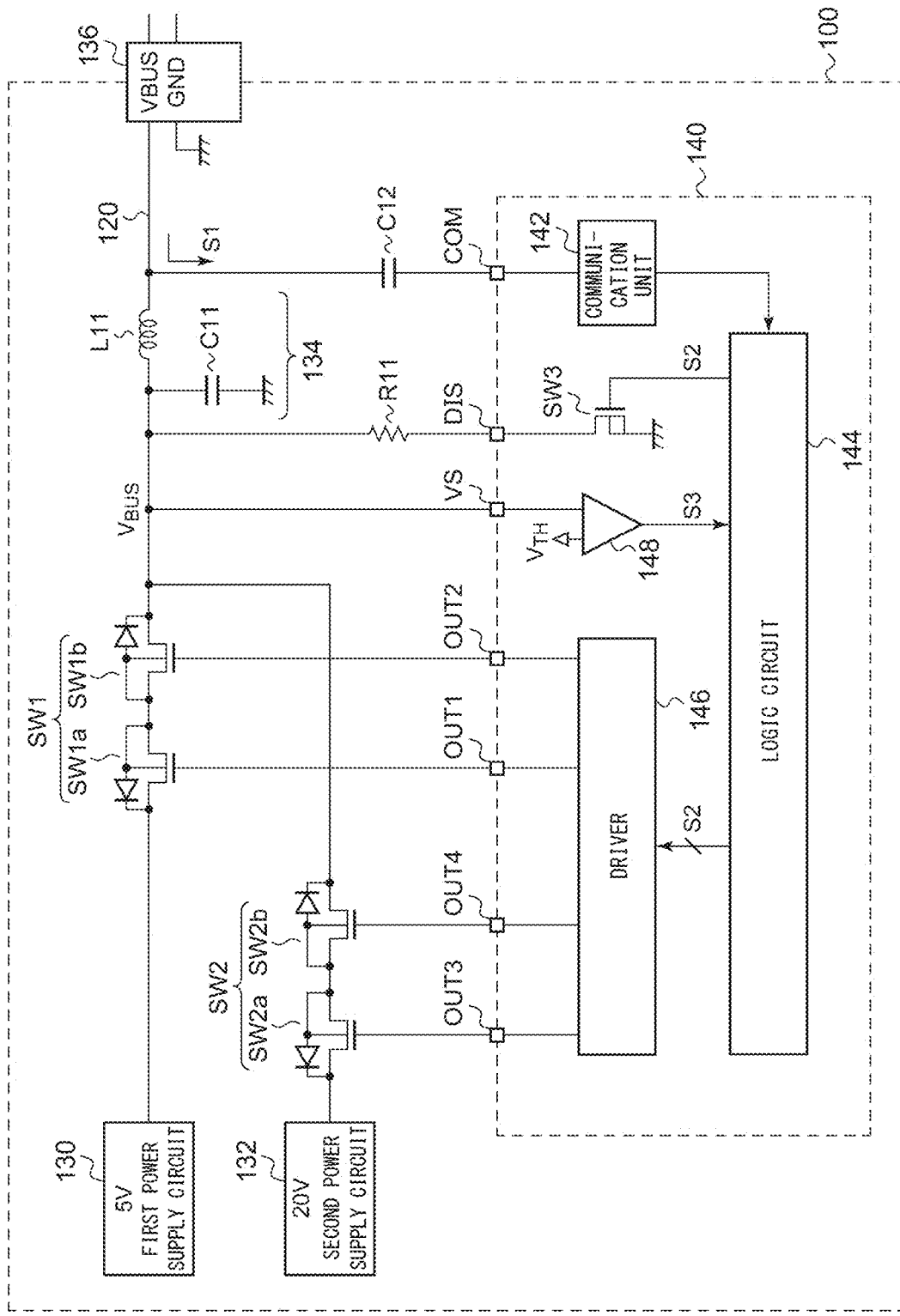
FIG. 3 is a block diagram showing a configuration of the power supply apparatus according to the first embodiment.

FIG. 3 is a block diagram showing a configuration of the power supply apparatus 100 according to a first embodiment.

The power supply apparatus 100 mainly includes a first power supply circuit 130, a second power supply circuit 132, a filter 134, a USB port 136, a first switch SW1, a second switch SW2, a discharge switch SW3, and a control circuit 140. The USB cable 214 is to be coupled to the USB port 136.

The bus line 220 is configured to transmit the bus voltage $V_{BUS}$ to be supplied to the power receiving apparatus 200 which is a power supply target.

The first power supply circuit 130 generates a first bus voltage $V_{BUS1}$ having a first voltage level V1. The second power supply circuit 132 generates a second bus voltage $V_{BUS2}$ having a second voltage level V2 that is higher than the first voltage level V1. The first power supply circuit 130 and the second power supply circuit 132 may each be configured as a linear regulator, charge pump circuit, DC/DC converter, or the like. The configuration of such a power supply circuit is not restricted in particular.

The first switch SW1 is arranged between the bus line 220 and the output terminal of the first power supply circuit 130. The second switch SW2 is arranged between the bus line 220 and the output terminal of the second power supply circuit 132. The control circuit 140 receives a control signal S1 via the bus line 220 from the power receiving apparatus 200 which is a power supply target. Furthermore, the control circuit 140 selects the voltage level based on the control signal S1, and controls the first switch SW1 and the second switch SW2 according to the voltage level thus selected.

The discharge switch SW3 is arranged between the bus line 220 and the ground. The discharge switch SW3 may be built into the control circuit 140. Otherwise, the discharge switch SW3 may be coupled as an external component in the same manner as the first switch SW1 and the second switch SW2.

An LC filter (which will also be referred to simply as the "filter") 134 prevents the control signal S1, to be used for communication via the bus line 220, from causing noise contamination on the first power supply circuit 130 side and the second power supply circuit 132 side. The filter 134 includes a capacitor C11 arranged between the bus line 220 and the ground and an inductor L11 arranged in series with the bus line 220.

The control signal S1 transmitted via the bus line 220 is input to the control circuit 140 via a DC block capacitor C12.

The control circuit 140 communicates with the power receiving apparatus 200 via the bus line 220, and selects the voltage level of the bus voltage $V_{BUS}$. In the present embodiment, the first voltage level V1 is 5 V, and the second voltage level V2 is 12 V or otherwise 20 V.

The control circuit 140 is configured to control the on/off state of each of the first switch SW1, the second switch SW2, and the discharge switch SW3. Specifically, when the first voltage level V1 is to be selected, the first switch SW1 is turned on, and the second switch SW2 is turned off. When the second voltage level V2 is to be selected, the first switch SW1 is turned off, and the second switch SW2 is turned on.

Furthermore, when the bus voltage $V_{BUS}$ is to be lowered from the second voltage level V2 to the first voltage level V1, the control circuit 140 turns on the discharge switch SW3.

It should be noted that, in a stage before the voltage level of the bus voltage $V_{BUS}$ is determined, the bus voltage $V_{BUS}$ of the first voltage level V1, which is a default voltage level, is supplied to the power receiving apparatus 200. In this state, the first power supply circuit 130 is enabled, and the second power supply circuit 132 is disabled. Furthermore, the first switch SW1 is turned on, the second switch SW2 is turned off, and the discharging switch SW3 is turned off as described later.

The first switch SW1 includes a first transistor SW1a and the second transistor SW1b coupled in series. The first transistor SW1a and the second transistor SW1b may also be exchanged. Similarly, the second switch SW2 includes a third transistor SW2a and a fourth transistor SW2b coupled in series. The third transistor SW2a and the fourth transistor SW2b may also be exchanged. The aforementioned transistors are each configured as an N-channel MOSFET (Metal Oxide Semiconductor Field Effect Transistor).

The back gate of the first transistor SW1a is coupled such that the cathode of its body diode is coupled to the output terminal side of the first power supply circuit 130. Furthermore, the back gate of the second transistor SW1b is coupled such that the cathode of its body diode is coupled to the bus line 220 side. The back gate of the third transistor SW2a is coupled such that the cathode of its body diode is coupled to the output terminal side of the second power supply circuit 132. Furthermore, the back gate of the fourth transistor SW2b is coupled such that the cathode of its body diode is coupled to the bus line 220 side.

When the voltage level of the bus voltage $V_{BUS}$ is to be switched, the control circuit 140 passes through a state in which the first transistor SW1a and the third transistor SW2a are each turned on, and the second transistor SW1b and the fourth transistor SW2b are each turned off. In this state, the first switch SW1 and the second switch SW2 function as a diode OR circuit. This generates a voltage on the bus line 220 corresponding to a higher voltage from among the output voltage of the first power supply circuit 130 and the output voltage of the second power supply circuit 132. This prevents the bus voltage $V_{BUS}$ from becoming unstable in the switching of the voltage level.

When the voltage of the bus line 220 drops to a threshold voltage that corresponds to the first voltage level after the discharge switch SW3 is turned on, the control circuit 140 turns off the discharge switch SW3.

Next, description will be made regarding the configuration of the control circuit 140. In addition to the discharge switch SW3, the control circuit 140 includes a communication unit 142, a logic circuit 144, a driver 146, and a comparator 148.

A communication terminal COM of the control circuit 140 is coupled to the bus line 220 via the DC block capacitor C12. A discharge terminal DIS is coupled to the bus line 220 via a discharge resistor R11. A discharge switch SW3 is arranged between the discharge terminal DIS and the ground. The communication unit 142 is coupled to the communication terminal COM so as to receive the control signal S1. The logic circuit 144 generates an instruction signal S2 which indicates the states of the first switch SW1, the second switch SW2, and the discharge switch SW3, based on the signal received by the communication unit 142.

The driver 146 switches the on/off state of each of the first switch SW1 and the second switch SW2 according to the instruction signal S2. As described above, the driver 146 includes a booster circuit that generates a gate voltage to be supplied to each of the N-channel MOS transistors that form the first switch SW1 and the second switch SW2.

The bus voltage $V_{BUS}$ is input to a voltage detection terminal VS. The comparator 148 compares the bus voltage $V_{BUS}$ with a threshold voltage $V_{TH}$ that corresponds to the first voltage level V1. The threshold voltage $V_{TH}$ may be equal to the first voltage level V1. The logic circuit 144 controls the discharge switch SW3 according to an output S4 of the comparator 148.

The above is the configuration of the power supply apparatus 100. Next, description will be made regarding the operation thereof.

Figure 4:
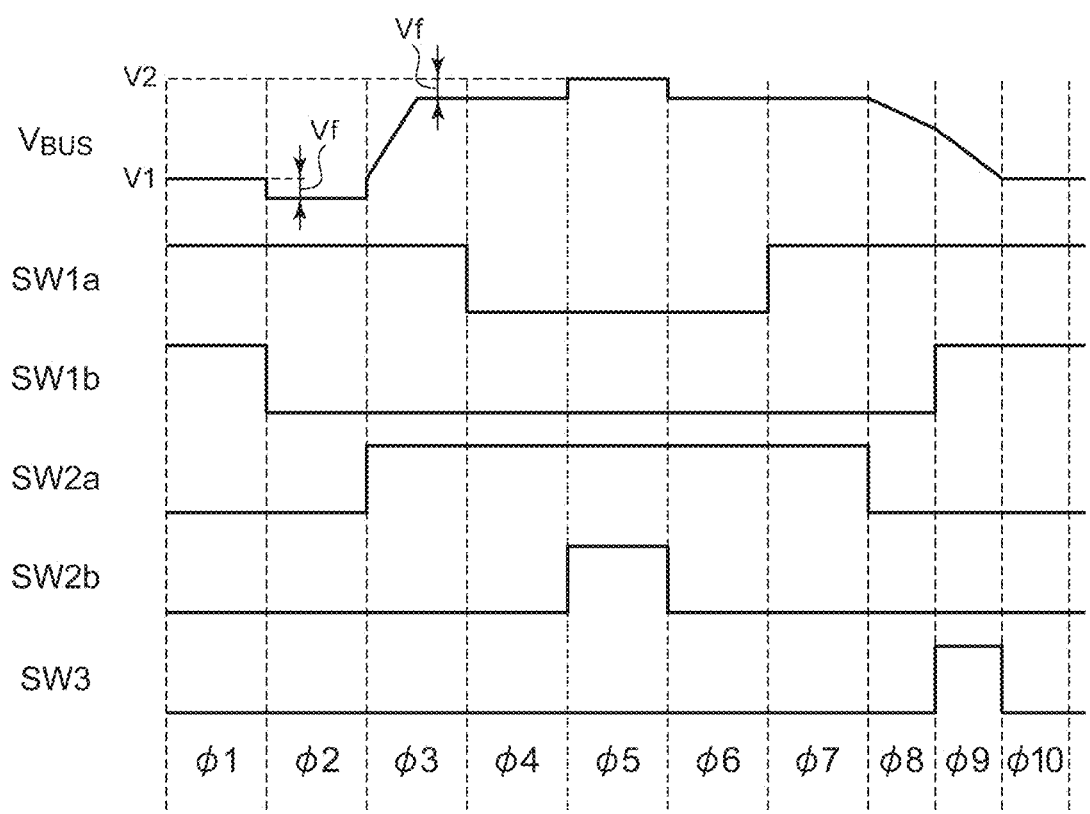
FIG. 4 is a waveform diagram showing the operation of the power supply apparatus shown in FIG. 3.

FIG. 4 is a waveform diagram showing the operation of the power supply apparatus 100. FIG. 4 shows the bus voltage $V_{BUS}$ and the states of each of the transistors SW1a, SW1b, SW2a, SW2b, and SW3. In the waveform for each switch, the high level corresponds to the on state, and the low level corresponds to the off state. FIGS. 5A through 5J are equivalent circuit diagrams of the power supply apparatus 100 in the respective states shown in FIG. 4.

In a first state φ1, i.e., in the initial state, the power supply apparatus 100 is set to a default state in which it supplies the bus voltage $V_{BUS}$ with V1=5 V. In the first state φ1, the first power supply circuit 130 is enabled, the first transistor SW1a and the second transistor SW1b are each turned on, and the third transistor SW2a and the fourth transistor SW2b are each turned off.

When the bus voltage $V_{BUS}$ is to be switched from the first voltage level V1 to the second voltage V2, the power supply apparatus 100 transits through the states from the first state φ1 to the fifth state φ5.

In the second state φ2, the first transistor SW1a is turned on, and the second transistor SW1b, the third transistor SW2a, and the fourth transistor SW2b are each turned off. In this state, the bus voltage $V_{BUS}$ is set to (V1−Vf). In a case in which Vf=0.7 V, the relation $V_{BUS}$=4.3 V holds true.

In the third state φ3, the first transistor SW1a and the third transistor SW2a are each turned on, and the second transistor SW1b and the fourth transistor SW2b are each turned off. In this state, the first switch SW1 and the second switch SW2 function as a diode OR circuit. This selects a higher voltage from among the output voltage of the first power supply circuit 130 and the output voltage V2 of the second power supply circuit 132. Accordingly, this prevents the bus voltage $V_{BUS}$ from becoming lower than 4.3 V.

In the fourth state φ4, the third transistor SW2a is turned on, and the first transistor SW1a, the second transistor SW1b, and the fourth transistor SW2b are each turned off. In this state, the bus voltage $V_{BUS}$ is set to (V2−Vf).

In the fifth state φ5, the third transistor SW2a and the fourth transistor SW2b are each turned on, and the first transistor SW1a and the second transistor SW1b are each turned off. In this state, the bus voltage $V_{BUS}$ is set to V2, thereby completing the switching of the voltage level.

Next, description will be made regarding the operation when the bus voltage $V_{BUS}$ is switched from the second voltage level V2 to the first voltage level V1. In this case, the power supply apparatus 100 transits through the states from the fifth state φ5 to the tenth state φ10.

In the fifth state φ5, i.e., in the initial state, the third transistor SW2a and the fourth transistor SW2b are each turned on, and the first transistor SW1a, the second transistor SW1b, and the discharge switch SW3 are each turned off.

In the sixth state φ6, the third transistor SW2a is turned on, and the first transistor SW1a, the second transistor SW1b, the fourth transistor SW2b, and the discharge switch SW3 are each turned off. In this state, the bus voltage $V_{BUS}$ is set to (V2−Vf).

In the seventh state φ7, the first transistor SW1a and the third transistor SW2a are each turned on, and the second transistor SW1b, the fourth transistor SW2b, and the discharge switch SW3 are each turned off. In this state, the bus voltage $V_{BUS}$ continues to be (V2−Vf).

In the eighth state φ8, the first transistor SW1a is turned on, and the second transistor SW1b, the third transistor SW2a, the fourth transistor SW2b, and the discharge switch SW3 are each turned off. In this state, the first switch SW1 and the second switch SW2 function as a diode OR circuit. This selects a higher voltage from among the output voltage of the first power supply circuit 130 and the output voltage V2 of the second power supply circuit 132. Accordingly, such an arrangement is capable of lowering the bus voltage $V_{BUS}$ while preventing the bus voltage $V_{BUS}$ from becoming lower than 4.3 V.

In the ninth state φ9, the first transistor SW1a, the second transistor SW1b, and the discharge switch SW3 are each turned on, and the third transistor SW2a and the fourth transistor SW2b are turned off. By turning on the discharge switch SW3, such an arrangement promotes the discharging of the capacitor C11, thereby allowing the bus voltage $V_{BUS}$ to be changed in a short period of time. The discharge rate can be adjusted according to the resistance value of the discharge resistor R11. When the bus voltage $V_{BUS}$ drops down to the threshold voltage $V_{TH}$=5 V, the detection signal S4, which is an output of the comparator 148, is asserted. When the detection signal S4 is asserted, the logic circuit 144 transits to the tenth state φ10.

In the tenth state φ10, the first transistor SW1a and the second transistor SW1b are each turned on, and the third transistor SW2a, the fourth transistor SW2b, and the discharge switch SW3 are each turned off. In this state, the bus voltage $V_{BUS}$ is set to V1, thereby completing the switching of the voltage level.

The above is the operation of the power supply apparatus 100.

With the power supply apparatus 100, there is no need to switch the output voltage for each of the first power supply circuit 130 and the second power supply circuit 132. Accordingly, this allows the power supply circuits to be configured with a low cost as compared with comparison techniques in which a single power supply circuit (DC/DC converter) supports a variable output.

Furthermore, by configuring each of the first switch SW1 and the second switch SW2 as a series connection of MOSFETs, this allows the output voltage to be selectively used from among the output voltages of the multiple power supply circuits 130 and 132 while preventing the current from flowing in the reverse direction. Furthermore, such an arrangement is capable of forming a diode OR circuit using the body diodes. This prevents unintended reduction in the bus voltage $V_{BUS}$.

In particular, the control circuit 140 switches the voltage level of the bus voltage $V_{BUS}$ via a state in which the first transistor SW1a and the third transistor SW2a are each turned on and the second transistor SW1b and the fourth transistor SW2b are each turned off. This prevents the bus voltage $V_{BUS}$ supplied to the power receiving apparatus 200 from becoming equal to or lower than (5-Vf).

Furthermore, in the power supply apparatus 100 that supports PD specification, the filter 134 is included. In the steady state, the capacitor C11 contributes to stabilization of the bus voltage $V_{BUS}$. However, in the transition state, the capacitor C11 leads to a reduction in the switching speed. By providing the discharge switch SW3, this allows the voltage level to be rapidly reduced.

Description has been made above regarding a first aspect of the present invention with reference to the first embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the first embodiment regarding an arrangement in which the first switch SW1 and the second switch SW2 are each configured with N-channel MOSFETs. However, the present invention is not restricted to such an arrangement. Also, the first switch SW1 and the second switch SW2 may each be configured with P-channel MOSFETs.

Description has been made in the first embodiment regarding an arrangement in which the discharge switch SW3 is turned on in the ninth state φ9. The present invention is not restricted to such an arrangement. Also, the discharge switch SW3 may be turned on in the eighth state φ8.

Description has been made in the first embodiment regarding an arrangement in which the bus voltage $V_{BUS}$ is switched between two voltage levels. Also, the present invention is applicable to an extended arrangement in which the bus voltage $V_{BUS}$ is switched between three or more voltage levels.

Second Embodiment

Figure 6:
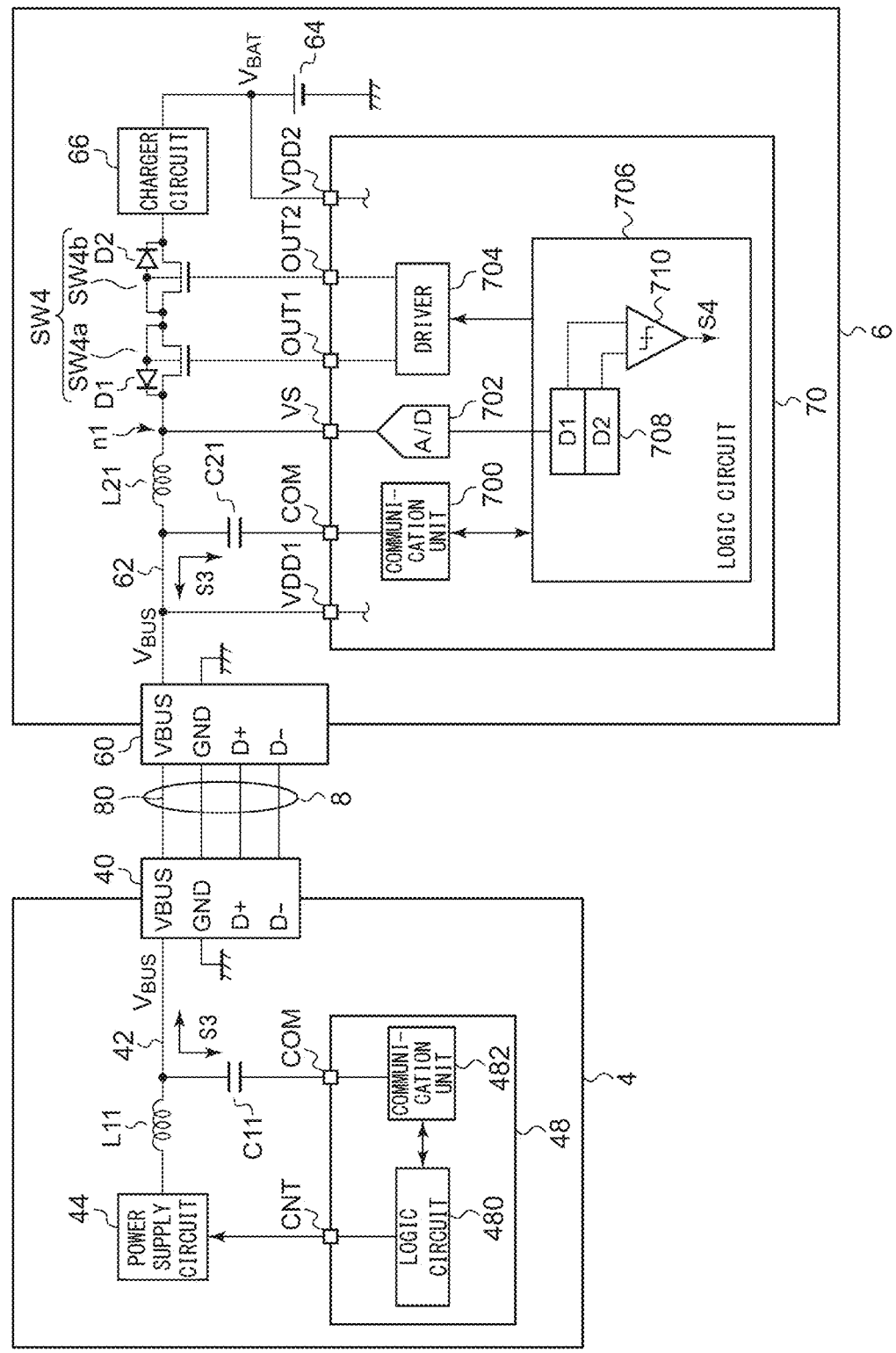
FIG. 6 is a block diagram showing a power supply system including a power receiving apparatus according to a second embodiment.

FIG. 6 is a block diagram showing a power supply system 1 including a power receiving apparatus 6 according to a second embodiment. The power supply system 1 includes a power supply apparatus 4 and the power receiving apparatus 6.

The power supply apparatus 4 and the power receiving apparatus 6 each supports USB-PD specification. The power receiving apparatus 6 is mounted on a battery-driven information terminal device such as a cellular phone terminal, tablet terminal, laptop PC (Personal Computer), digital still camera, digital video camera, or the like.

The power supply apparatus 4 and the power receiving apparatus 6 include connectors 40 and 60, respectively. The power supply apparatus 4 and the power receiving apparatus 6 are configured such that their connectors can be coupled via a USB cable 8. The power receiving apparatus 6 is configured to receive the supply of the bus voltage $V_{BUS}$ from the power supply apparatus 4, and to be capable of charging a built-in secondary battery 64.

First, description will be made regarding a configuration of the power supply apparatus 4. The power supply apparatus 4 includes a bus line 42, a power supply circuit 44, and a control circuit 48, in addition to the connector 40. The connector 40 includes a $V_{BUS}$ terminal, a GND (ground) terminal, and data terminals D+ and D−.

The output of the power supply circuit 44 and the $V_{BUS}$ terminal of the connector 40 are coupled via the bus line 42. A communication protocol is defined for communication between the power supply apparatus 4 and the power receiving apparatus 6 that supports PD specification. This allows information to be transmitted via the bus line 80. The communication is performed in a manner in which a modulated control signal S3 is superimposed on the bus voltage $V_{BUS}$ to be transmitted via the bus line 80. The power supply apparatus 4 and the power receiving apparatus 6 determine the voltage level of the bus voltage $V_{BUS}$ and an amount of charging current based on negotiation using the control signal S3. The control signal S3 acts as noise as viewed from the power supply system. In order to remove this noise, an inductor L11 is provided on a path of the bus line 42.

A communication (COM) terminal of the control circuit 48 is coupled with the bus line 42 via a DC block capacitor C11. A communication unit 482 of the control circuit 48 transmits and receives the control signal S3 via the DC block capacitor C11. A logic circuit 480 selects the bus voltage $V_{BUS}$ based on the control signal S3, and controls the power supply circuit 44. Thus, the power supply circuit 44 supplies the bus voltage $V_{BUS}$ via the bus line 42 and a bus line 80.

Next, description will be made regarding a configuration of the power receiving apparatus 6. The power receiving apparatus 6 includes the connector 60, a bus line 62, a secondary battery 64, a charger circuit 66, and a control circuit 70.

The secondary battery 64 is configured as a secondary battery such as a lithium-ion battery, a nickel hydride battery, or the like. The secondary battery 64 outputs the battery voltage $V_{BAT}$. The number of cells employed in the secondary battery 64 is designed according to various kinds of power receiving apparatuses 6. In the case of employing a single cell, the battery voltage $V_{BAT}$ is on the order of appropriately 4.5 V. In the case of employing two cells, the battery voltage $V_{BAT}$ is approximately 9 V. Accordingly, in a case in which the power supply apparatus 4 is coupled to the power receiving apparatus 6 including the built-in secondary battery 64 comprising a single cell, a bus voltage $V_{BUS}$ of 5 V may preferably be supplied, which is sufficient. However, for the power receiving apparatus 6 including the built-in secondary battery 64 comprising two or more cells, the power supply apparatus 4 is required to supply a bus voltage $V_{BUS}$ of 12 V or otherwise 20 V.

The bus voltage $V_{BUS}$ is supplied from the power supply apparatus 4 to the $V_{BUS}$ terminal of the USB port 60. The $V_{BUS}$ terminal of the connector 60 and the charger circuit 66 are coupled via the bus line 62. An inductor L21 and a switch SW4 are arranged on a path of the bus line 62.

The switch SW4 is arranged on a path of the bus line 62. When the switch SW4 is turned on, the bus voltage $V_{BUS}$ is input to the charger circuit 66. Conversely, when the switch SW4 is turned off, the bus voltage $V_{BUS}$ is not supplied to the charger circuit 66. The switch SW4 includes a first transistor SW4a and a second transistor SW4b that are respectively N-channel MOSFETs coupled in series. The back gates of the first transistor SW4a and the second transistor SW4b are coupled such that the directions of their body diodes D1 and D2 are the reverse of each other. Such an arrangement is capable of preventing the current from flowing in the reverse direction.

The charger circuit 66 receives the bus voltage $V_{BUS}$, and charges the secondary battery 64. The inductor L21 is provided in order to remove noise.

The control circuit 70 is a function IC monolithically integrated on a single semiconductor substrate. The COM terminal of the control circuit 70 is coupled to the bus line 62 via a DC block capacitor C21. The bus voltage $V_{BUS}$ is supplied to a power supply (VDD1) terminal. The battery voltage $V_{BAT}$ is supplied to a power supply (VDD2) terminal. The control circuit 70 operates using the battery voltage $V_{BAT}$ or otherwise the bus voltage $V_{BUS}$ as a power supply. A voltage detection (VS) terminal is coupled to the bus line 62. The VS terminal is coupled to a node n1 that is closer to the connector 60 side than the switch SW4. More preferably, the node n1 is provided at a position that is closer to the charger circuit 66 side than the inductor L21. Output terminals (OUT1, OUT2) of the control circuit 70 are coupled to the gates of the transistors SW4a and SW4b of the switch SW4.

The control circuit 70 communicates with the control circuit 48 of the power supply apparatus 4 via the bus line 62, the bus line 80, and the bus line 42, and controls the switch SW4. Furthermore, the control circuit 70 is configured to be capable of detecting an abnormal state of the USB cable 8 or the like.

The control circuit 70 is configured to be capable of executing the following operations.

(1) The control circuit 70 determines the voltage level of the bus voltage $V_{BUS}$ based on communication with the power supply apparatus 4.

(2) The control circuit 70 stores the voltage level of the bus voltage $V_{BUS\_INIT}$ supplied to the bus line 62 in a state in which the switch SW4 is turned off after the power supply apparatus 4 starts to supply the bus voltage $V_{BUS}$ with the voltage level thus determined.

(3) Subsequently, in a state in which the switch SW4 is turned on, when the voltage level of the bus voltage $V_{BUS}$ becomes lower than a threshold value $V_{TH}$ that corresponds to the voltage level of the bus voltage $V_{BUS}$ thus stored, the control circuit 70 asserts an abnormal state detection signal S4.

The control circuit 70 includes a communication unit 700, an A/D converter 702, a driver 704, and a logic circuit 706. The communication unit 700 communicates with the power supply apparatus 4 via the bus line 62. The A/D converter 702 is coupled to the node n1 of the bus line 62 via the VS terminal. The A/D converter 702 converts the bus voltage $V_{BUS\_INIT}$ supplied to the bus line 62 into a digital value D1. The digital value (which will also be referred to as the "initial value") D1 is stored in a register 708a of the logic circuit 706. Furthermore, after the switch SW4 is turned on, the A/D converter 702 periodically converts the bus voltage $V_{BUS}$ into a digital value D2, and stores the digital value D2 thus converted in the register 708.

The driver 704 controls the on/off operation of the switch SW4. In a case in which the switch SW4 is configured with N-channel MOSFETs as described above, the driver 704 includes a booster circuit.

The logic circuit 706 is configured: (1) to determine the voltage level of the bus voltage $V_{BUS}$; (2) to hold the digital value D1 acquired in a state in which the switch SW4 is turned off; (3) to turn on the switch SW4; and (4) to compare the held digital value D1 with the digital value D2 acquired after the switch SW4 is turned on. The logic circuit 706 includes the register 708 and a comparator 710. The register 708 stores the initial value D1 and the digital value D2 acquired for every predetermined period. The comparator 710 compares the digital value D2 with a threshold value $D_{TH}$ determined according to the initial value D1. The threshold value $D_{TH}$ is set to a value that is smaller than the initial value D1 by a value that corresponds to a predetermined voltage width $\Delta V$. The following relation expression holds true between the threshold voltage $V_{TH}$ and the initial voltage $V_{BUS}$. Here, $\Delta V$ is set to a value on the order of 1 V.

$$V_{TH} = V_{BUS\_INIT} - \Delta V$$

Figure 7:
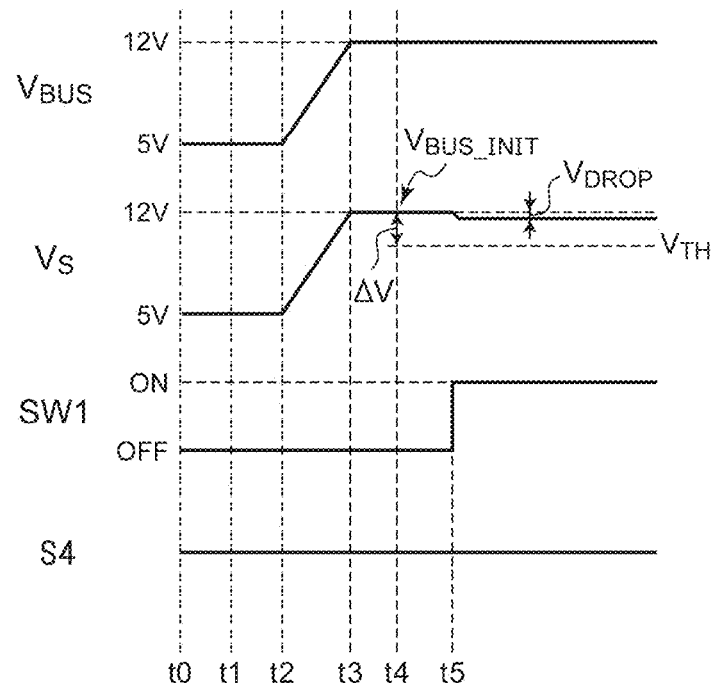
FIG. 7 is an operation waveform diagram showing a normal operation of the power receiving apparatus shown in FIG. 6.
Figure 8:
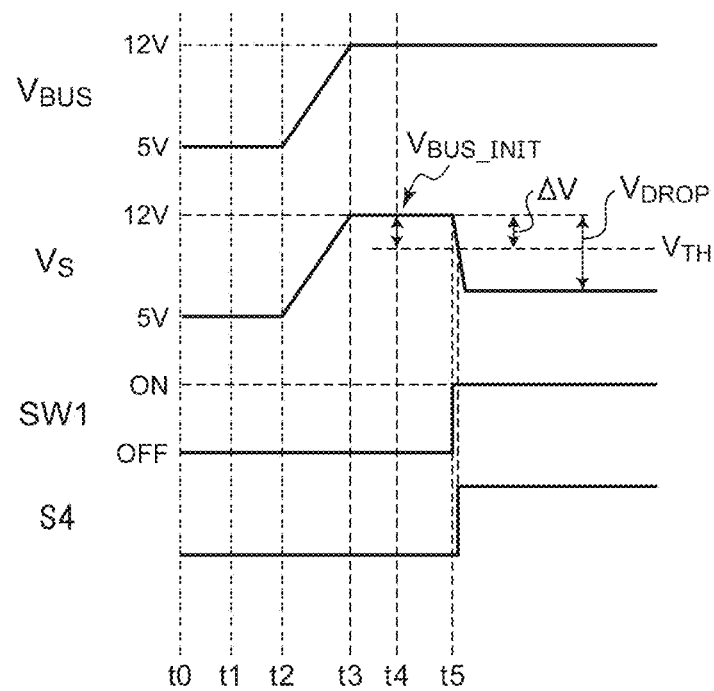
FIG. 8 is an operation waveform diagram showing an abnormal operation of the power receiving apparatus shown in FIG. 6.

The above is the schematic configuration of the power receiving apparatus 6. Next, description will be made regarding the operation of the power receiving apparatus 6. FIGS. 7 and 8 are operation waveform diagrams each showing the operation of the power receiving apparatus 6 shown in FIG. 6. FIG. 7 shows the operation when the power supply system is normal, and FIG. 8 shows the operation when the power supply system is abnormal. Examples of such an abnormal state include: partial disconnection of the bus line 80, 42, or 62 (which will collectively be referred to as the "charging path" hereafter); a short circuit to the ground; and a loose connection of the connector 40 or 60.

First, description will be made regarding the normal operation with reference to FIG. 7. Here, $V_S$ represents the electric potential at the node n1 on the bus line 62.

During a period t0 to t1 immediately after the power supply apparatus 4 and the power receiving apparatus 6 are coupled, the power supply circuit 44 generates the bus voltage $V_{BUS}$ of 5 V, which is a default value. During the following period t1 to t2, negotiation is performed between the power supply apparatus 4 and the power receiving apparatus 6, and the voltage level of the bus voltage $V_{BUS}$ is determined. After the time point t3, the power supply circuit 44 generates the bus voltage $V_{BUS}$ with the determined voltage level (e.g., 12 V).

When the bus voltage $V_{BUS}$ becomes stable at the time point t4 after the time point t3, the initial bus voltage $V_{BUS\_INIT}$ is measured in a state in which the switch SW4 is turned off, and the threshold voltage $V_{TH}$ is determined. In this stage, the switch SW4 is turned off, and accordingly, the current that flows through the bus line becomes substantially zero. Thus, $V_S$ is approximately equal to $V_{BUS}$ regardless of the impedance of the bus line.

At the time point t5, the switch SW4 is turned on, which starts the charging operation. With the impedance of the charging path as Z, and with the charging current as I, the electric potential $V_S$ at the node n1 is represented by the following Expression. Here, $V_{DROP}$ represents the voltage drop that occurs due to the impedance Z.

$$V_S = V_{BUS} - V_{DROP} = V_{BUS} - Z \times I$$

In a case in which partial disconnection or the like in the charging path has not occurred, the impedance Z exhibits a sufficiently small value. Accordingly, the voltage drop $V_{DROP}$ is lower than $\Delta V$. In this case, the abnormal state detection signal S4 is not asserted. As a result, judgment is made that the system is normal. Such partial disconnection does not represent a complete disconnection that leads to an infinite impedance. Instead, the partial disconnection represents a disconnection state in which the impedance remains finite.

Next, description will be made regarding the abnormal operation with reference to FIG. 8. The operations from the time point t0 to the time point t4 are the same as those shown in FIG. 7.

At the time point t5, the switch SW4 is turned on, which starts the charging operation. In a case in which partial disconnection or the like has occurred in the bus line, the impedance Z exhibits a very large value. In this case, the voltage drop $V_{DROP}$ is larger than $\Delta V$. As a result, the abnormal state detection signal S4 is asserted. Thus, judgment is made that the system is abnormal.

The above is the operation of the power receiving apparatus 6.

As described above, with the power receiving apparatus 6 according to the present embodiment, the switch SW4 is included on the charging path. In a state in which the switch SW4 is turned off, the actually supplied bus voltage $V_{BUS}$ is measured. Furthermore, the threshold voltage $V_{TH}$ is set based on the bus voltage $V_{BUS}$ thus measured. Such an arrangement is capable of detecting an abnormal state due to the cable, connector, or the like, even in the case of employing the PD specification that supports the variable bus voltage $V_{BUS}$.

Furthermore, with the power receiving apparatus 6, such an arrangement is capable of detecting an abnormal state such as a short circuit fault to the ground or the like that occurs after the charging operation has started.

Furthermore, the node n1 at which the control circuit 70 monitors the voltage is arranged at a position that is closer to the charger circuit 66 side than the inductor L21. This allows the threshold voltage $V_{TH}$ to be set without being affected by voltage fluctuation on the bus line 62 due to the communication by the communication unit 700.

Figure 9:
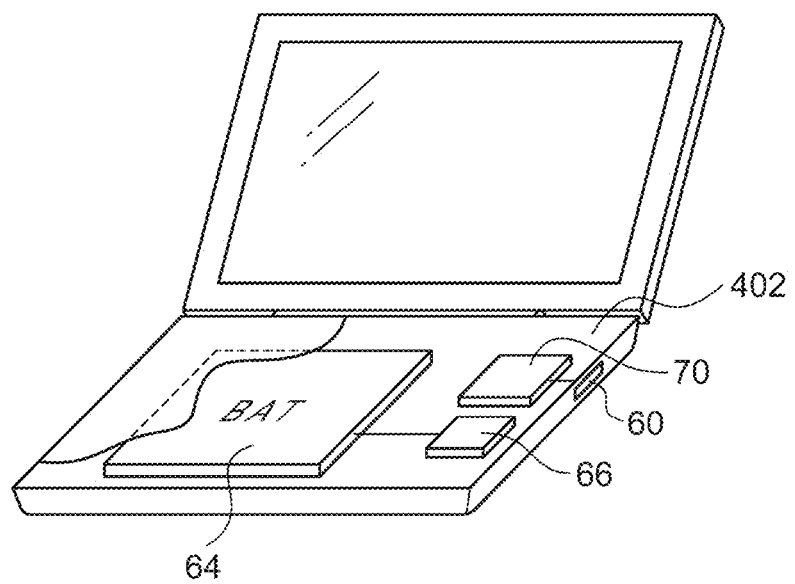
FIG. 9 is a diagram showing an example of an electronic device mounting the power receiving apparatus shown in FIG. 6.

Lastly, description will be made regarding a specific example of the power receiving apparatus 6. FIG. 9 is a diagram showing an example of an electronic device mounting the power receiving apparatus 6 shown in FIG. 6. An electronic device 400 shown in FIG. 9 is a laptop PC. The electronic device 400 includes a connector 60 on a side face of its housing 402. The housing 402 includes the control circuit 70, the charger circuit 66, the secondary battery 64, and the like as built-in components. In many cases, such a laptop PC or tablet PC mounts a large-capacity secondary battery 64 including two or more cells. Accordingly, such an electronic device is preferably employed as a usage of the power receiving apparatus 6 according to the present embodiment.

Description has been made above regarding a second aspect of the present invention with reference to the second embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Description has been made in the second embodiment regarding an arrangement in which the switch SW4 is configured with N-channel MOSFETs. However, the present invention is not restricted to such an arrangement. Also, P-channel MOSFETs may also be employed.

[Second Modification]

Description has been made in the embodiment regarding an arrangement in which the power receiving apparatus 6 is built into an electronic device. However, the present invention is not restricted to such an arrangement. For example, the power receiving apparatus 6 may be mounted on an AC adapter or a USB charger (which will be collectively referred to as the "charger adapter"). In this case, the secondary battery 64 is not included in the power receiving apparatus 6, unlike an arrangement shown in FIG. 6 in which the secondary battery 64 is a component of the power receiving apparatus 6.

While the preferred embodiments of the present invention have been described using specific terms, such description is for illustrative purposes only, and it is to be understood that changes and variations may be made without departing from the spirit or scope of the appended claims.

What is claimed is:

1. A power receiving apparatus that supports USB-PD (Universal Serial Bus-Power Delivery) specification, the power receiving apparatus comprising: a connector to which a USB cable is to be coupled and to which a bus voltage is supplied via the USB cable;
    a charger circuit structured to charge a secondary battery;
    a bus line structured to couple the connector to an input of the charger circuit, and structured to transmit the bus voltage to the input of the charger circuit;
    a switch arranged on the bus line and externally positioned from the charger circuit, the switch comprising:
        a first end coupled to the connector; and
        a second end coupled to the input of the charger circuit so that a voltage at the first end is applied to the second end when the switch is in an on-state; and
    a control circuit structured to communicate with a power supply apparatus via the bus line, to control the switch, and to be capable of detecting an abnormal state of the USB cable,
    wherein the control circuit determines a voltage level of the bus voltage based on communication with the power supply apparatus,
    wherein, after the power supply apparatus starts to supply the bus voltage of the determined voltage level, the control circuit stores the voltage level of the bus voltage supplied to the bus line in a state in which the switch is turned off,
    and wherein, subsequently, in a state in which the switch is turned on, when the voltage level of the bus voltage becomes lower than a threshold value that corresponds to the voltage level of the bus voltage thus stored, the control circuit asserts an abnormal state detection signal.

2. The power receiving apparatus according to claim 1, wherein the control circuit comprises:
    a communication unit structured to communicate with the power supply apparatus via the bus line;

an A/D converter coupled to the bus line, and structured to convert the bus voltage supplied to the bus line into a digital value;

a driver structured to control on/off switching of the switch; and a logic circuit structured: (1) to determine a voltage level of the bus voltage; (2) to hold the digital value acquired in a state in which the switch is turned off; (3) to turn on the switch; and (4) to compare the digital value thus held with a digital value acquired after the switch is turned on.

3. The power receiving apparatus according to claim 2, comprising:

an inductor coupled in series with the bus line; and a DC block capacitor arranged such that one end thereof is coupled to the bus line, and the other end thereof is coupled to the communication unit of the control circuit.

4. The power receiving apparatus according to claim 1, wherein the switch comprises a first transistor and a second transistor coupled in series, and wherein back gates of the first transistor and the second transistor are coupled such that directions of respective body diodes thereof are the reverse of each other.

5. The power receiving apparatus according to claim 2, wherein the driver comprises a booster circuit.

6. The power receiving apparatus according to claim 1, wherein the secondary battery is configured as a multi-cell battery.

7. An electronic device comprising the power receiving apparatus according to claim 1.

8. A charger adapter comprising the power receiving apparatus according to claim 1.

9. A control circuit employed for a power receiving apparatus that supports USB-PD (Universal Serial Bus-Power Delivery) specification, wherein the power receiving apparatus comprises:

a connector to which a USB cable is to be coupled and to which a bus voltage is supplied via the USB cable;

a charger circuit structured to charge a secondary battery;

a bus line structured to couple the connector to an input of the charger circuit, and structured to transmit the bus voltage to the input of the charger circuit; and a switch arranged on the bus line and externally positioned from the charger circuit, the switch comprising:

a first end coupled to the connector; and a second end coupled to the input of the charger circuit so that a voltage at the first end is applied to the second end when the switch is in an on-state, wherein the control circuit determines a voltage level of the bus voltage based on communication with the power supply apparatus via the bus line, wherein, after the power supply apparatus starts to supply the bus voltage of the determined voltage level, the control circuit stores the voltage level of the bus voltage supplied to the bus line in a state in which the switch is turned off, and wherein, subsequently, in a state in which the switch is turned on, when the voltage level of the bus voltage becomes lower than a threshold value that corresponds to the voltage level of the bus voltage thus stored, the control circuit asserts an abnormal state detection signal.

10. The control circuit according to claim 9, comprising:

a communication unit structured to communicate with the power supply apparatus via the bus line;

an A/D converter coupled to the bus line, and structured to convert the bus voltage supplied to the bus line into a digital value;

a driver structured to control on/off switching of the switch; and a logic circuit structured: (1) to determine a voltage level of the bus voltage; (2) to hold the digital value acquired in a state in which the switch is turned off; (3) to turn on the switch; and (4) to compare the digital value thus held with a digital value acquired after the switch is turned on.

11. The control circuit according to claim 10, wherein the power receiving apparatus comprises:

an inductor coupled in series with the bus line; and a DC block capacitor arranged such that one end thereof is coupled to the bus line, and the other end thereof is coupled to the communication unit of the control circuit.

12. The control circuit according to claim 9, wherein the switch comprises a first transistor and a second transistor coupled in series, and wherein back gates of the first transistor and the second transistor are coupled such that directions of respective body diodes thereof are the reverse of each other.

13. The control circuit according to claim 10, wherein the driver comprises a booster circuit.

14. The control circuit according to claim 9, wherein the secondary battery is configured as a multi-cell battery.

15. The control circuit according to claim 9, monolithically integrated on a single semiconductor substrate.

16. An abnormal state detection method for a power supply system that supports USB-PD (Universal Serial Bus-Power Delivery) specification, wherein the power supply system comprises:

a power supply apparatus;

a power receiving apparatus;

a USB cable via which the power supply apparatus and the power receiving apparatus are coupled, and via which a bus voltage generated by the power supply apparatus is supplied to the power receiving apparatus, wherein the power receiving apparatus comprises:

a connector to which the USB cable is to be coupled and to which the bus voltage is supplied via the USB cable;

a charger circuit structured to charge a secondary battery;

a bus line structured to couple the connector to an input of the charger circuit, and structured to transmit the bus voltage to the input of the charger circuit; and a switch arranged on the bus line and externally positioned from the charger circuit, the switch comprising:

a first end coupled to the connector; and a second end coupled to the input of the charger circuit so that a voltage at the first end is applied to the second end when the switch is in an on-state, and wherein the abnormal state detection method comprises:

determining a voltage level of the bus voltage based on communication between the power supply apparatus and the power receiving apparatus via the bus line;

storing the voltage level of the bus voltage supplied to the bus line in a state in which the switch is turned off after the power supply apparatus starts to supply the bus voltage with the voltage level thus determined; and asserting an abnormal state detection signal when the voltage level of the bus voltage obtained in a state in which the switch is turned on becomes lower than a threshold value that corresponds to the voltage level of the bus voltage thus stored.

\* \* \* \* \*